(12) United States Patent
Chen et al.

(10) Patent No.: US 7,781,363 B2
(45) Date of Patent: Aug. 24, 2010

(54) SELF LIMITING CATALYST COMPOSITION AND PROPYLENE POLYMERIZATION PROCESS

(75) Inventors: Linfeng Chen, Sugar Land, TX (US); Richard E. Campbell, Jr., Midland, MI (US)

(73) Assignee: Dow Global Technologies Inc., Midland, MI (US)

(*) Notice: Subject to any disclaimer, the term of this patent is extended or adjusted under 35 U.S.C. 154(b) by 0 days.

(21) Appl. No.: 12/352,253

(22) Filed: Jan. 12, 2009

(65) Prior Publication Data
US 2009/0118118 A1 May 7, 2009

Related U.S. Application Data

(63) Continuation of application No. 10/568,930, filed as application No. PCT/US2004/030496 on Sep. 17, 2004, now Pat. No. 7,491,670.

(60) Provisional application No. 60/579,529, filed on Jun. 14, 2004, provisional application No. 60/505,313, filed on Sep. 23, 2003, provisional application No. 60/505,314, filed on Sep. 23, 2003.

(51) Int. Cl.
*C08F 4/642* (2006.01)
*C08F 4/649* (2006.01)

(52) U.S. Cl. ............ 502/116; 502/127; 526/124.9; 526/125.1; 526/125.3; 526/125.6

(58) Field of Classification Search ............ 502/116, 502/127; 526/124.9, 125.3, 125.6, 125.1
See application file for complete search history.

(56) References Cited

U.S. PATENT DOCUMENTS

| | | | |
|---|---|---|---|
| 4,107,413 A | 8/1978 | Giannini et al. | |
| 4,115,319 A | 9/1978 | Scata et al. | |
| 4,220,554 A | 9/1980 | Scata et al. | |
| 4,294,721 A | 10/1981 | Cecchin et al. | |
| 4,330,649 A | 5/1982 | Kioka et al. | |
| 4,439,540 A | 3/1984 | Cecchin et al. | |
| 4,442,276 A | 4/1984 | Kashiwa et al. | |
| 4,460,701 A | 7/1984 | Terano et al. | |
| 4,472,521 A | 9/1984 | Band | |
| 4,521,566 A | 6/1985 | Galli et al. | |
| 4,535,069 A * | 8/1985 | Shimizu et al. | 502/115 |
| 4,540,679 A | 9/1985 | Arzoumanidis et al. | |
| 4,547,476 A | 10/1985 | Terano et al. | |
| 4,548,915 A | 10/1985 | Goodall et al. | |
| 4,562,173 A | 12/1985 | Terano et al. | |
| 4,693,990 A * | 9/1987 | Hiroyuki et al. | 502/116 |
| 4,728,705 A | 3/1988 | Nestlerode et al. | |
| 4,816,433 A | 3/1989 | Terano et al. | |
| 4,829,037 A | 5/1989 | Terano et al. | |
| 4,927,797 A | 5/1990 | Ewen | |
| 4,990,479 A | 2/1991 | Ishimaru et al. | |
| 5,028,671 A | 7/1991 | Kioka et al. | |
| 5,034,361 A | 7/1991 | Job et al. | |
| 5,066,737 A | 11/1991 | Job | |
| 5,066,738 A | 11/1991 | Ewen | |
| 5,077,357 A | 12/1991 | Job | |
| 5,082,907 A | 1/1992 | Job | |
| 5,100,981 A | 3/1992 | Schreck et al. | |
| 5,106,806 A | 4/1992 | Job | |
| 5,146,028 A | 9/1992 | Job | |
| 5,151,399 A | 9/1992 | Job | |
| 5,153,158 A | 10/1992 | Kioka et al. | |
| 5,192,732 A | 3/1993 | Duranel et al. | |
| 5,229,342 A | 7/1993 | Job | |
| 5,247,031 A | 9/1993 | Kioka et al. | |
| 5,247,032 A | 9/1993 | Kioka et al. | |
| 5,414,063 A | 5/1995 | Seeger et al. | |
| 5,432,244 A * | 7/1995 | Rebhan | 526/124.8 |
| 5,652,303 A | 7/1997 | Ishimaru et al. | |
| 5,844,046 A | 12/1998 | Ohgizawa et al. | |
| 5,849,654 A | 12/1998 | Fushimi et al. | |
| 5,869,418 A | 2/1999 | Iiskola et al. | |
| 6,066,702 A | 5/2000 | Ro et al. | |
| 6,087,459 A | 7/2000 | Miro et al. | |
| 6,096,844 A | 8/2000 | Fushimi et al. | |
| 6,111,039 A | 8/2000 | Miro et al. | |
| 6,127,303 A | 10/2000 | Ebara et al. | |
| 6,133,385 A | 10/2000 | Shamshoum et al. | |
| 6,147,024 A | 11/2000 | Shamshoum et al. | |
| 6,184,328 B1 | 2/2001 | Yanagihara et al. | |

(Continued)

FOREIGN PATENT DOCUMENTS

EP 490451 A2 6/1992

(Continued)

OTHER PUBLICATIONS

PCT Notification of Transmittal of The International Search Report and The Written Opinion of the International Searching Authority, of the Declaration, mailed Dec. 3, 2004 for International Patent Application PCT/US2004/030496, filed on Sep. 17, 2004.

(Continued)

*Primary Examiner*—Caixia Lu
(74) *Attorney, Agent, or Firm*—Whyte Hirschboeck Dudek SC

(57) ABSTRACT

A catalyst composition for the polymerization of propylene comprising one or more Ziegler-Natta procatalyst compositions comprising one or more transition metal compounds and one or more esters of aromatic dicarboxylic acid internal electron donors; one or more aluminum containing cocatalysts; a selectivity control agent (SCA) comprising at least one silicon containing compound containing at least one $C_{1-10}$ alkoxy group bonded to a silicon atom, and one or more activity limiting agent (ALA) compounds comprising one or more aliphatic or cycloaliphatic carboxylic acids; alkyl-, cycloalkyl- or alkyl(poly)(oxyalkyl)-(poly)ester derivatives thereof; or inertly substituted derivatives of the foregoing.

20 Claims, No Drawings

U.S. PATENT DOCUMENTS

| | | | |
|---|---|---|---|
| 6,303,698 | B1 | 10/2001 | Ushioda et al. |
| 6,303,715 | B1 * | 10/2001 | Kim et al. ............... 526/128 |
| 6,337,377 | B1 | 1/2002 | Ebara et al. |

FOREIGN PATENT DOCUMENTS

| | | |
|---|---|---|
| EP | 630910 A1 | 12/1994 |
| EP | 736552 A2 | 10/1996 |
| JP | 61203105 | 9/1986 |
| WO | 95/21203 A1 | 8/1995 |
| WO | 99/20663 A2 | 4/1999 |
| WO | 99/58585 A1 | 11/1999 |

OTHER PUBLICATIONS

Chinese Search Report for related CN 200480027561.5 filed on Sep. 17, 2004.

EP Search Report for related EP 04784378.4 filed Sep. 17, 2004.

State Intellectual Property Office of the P.R. China Examination Report under Memorandum of Understanding Between GCC and SIPO for related GCC/P/2004/3826 filed Sep. 21, 2004.

Nonfinal office action mailed Jun. 23, 2009 for U.S. Appl. No. 12/352,173, filed on Jan. 12, 2009.

* cited by examiner

SELF LIMITING CATALYST COMPOSITION AND PROPYLENE POLYMERIZATION PROCESS

CROSS-REFERENCE TO RELATED APPLICATIONS

This application is a continuation of U.S. patent application Ser. No. 10/568,930 filed on Feb. 21, 2006, which claims priority to PCT/US04/30496 filed on Sep. 17, 2004, which claims the benefit of U.S. Provisional Application Nos. 60/579,529; 60/505,313 and 60/505,314, filed Jun. 14, 2004; Sep. 23, 2003 and Sep. 23, 2003, respectively.

BACKGROUND OF THE INVENTION

The present invention relates to stereoselective Ziegler-Natta catalyst compositions for use in the polymerization of propylene having improved control over polymerization activity and reactor process continuity through the use of carefully chosen mixtures of selectivity control agents (SCA) and activity limiting agents (ALA).

Ziegler-Natta propylene polymerization catalyst compositions are well known in the art. Typically, these compositions include transition metal moieties, especially titanium, magnesium and halide moieties in combination with an internal electron donor (referred to as a procatalyst); a co-catalyst, usually an organoaluminum compound; and a SCA. Examples of such Ziegler-Natta catalyst compositions are shown in: U.S. Pat. No. 4,107,413; U.S. Pat. No. 4,115,319; U.S. Pat. No. 4,220,554; U.S. Pat. No. 4,294,721; U.S. Pat. No. 4,330,649; U.S. Pat. No. 4,439,540; U.S. Pat. No. 4,442,276; U.S. Pat. No. 4,460,701; U.S. Pat. No. 4,472,521; U.S. Pat. No. 4,540,679; U.S. Pat. No. 4,547,476; U.S. Pat. No. 4,548,915; U.S. Pat. No. 4,562,173; U.S. Pat. No. 4,728,705; U.S. Pat. No. 4,816,433; U.S. Pat. No. 4,829,037; U.S. Pat. No. 4,927,797; U.S. Pat. No. 4,990,479; U.S. Pat. No. 5,028,671; U.S. Pat. No. 5,034,361; U.S. Pat. No. 5,066,737; U.S. Pat. No. 5,066,738; U.S. Pat. No. 5,077,357; U.S. Pat. No. 5,082,907; U.S. Pat. No. 5,106,806; U.S. Pat. No. 5,146,028; U.S. Pat. No. 5,151,399; U.S. Pat. No. 5,153,158; U.S. Pat. No. 5,229,342; U.S. Pat. No. 5,247,031; U.S. Pat. No. 5,247,032 and U.S. Pat. No. 5,432,244.

Catalyst compositions designed primarily for the polymerization of propylene or mixtures of propylene and ethylene generally include a SCA in order to affect polymer properties, especially tacticity or stereoregularity of the polymer backbone. As one indication of the level of tacticity, especially the isotacticity of polypropylene, the quantity of such polymer that is soluble in xylene, trichlorobenzene (TCB), or similar liquid that is a non-solvent for the tactic polymer is often used. The quantity of such polymer that is soluble in xylene is referred to as xylene solubles content or XS. In addition to tacticity control, molecular weight distribution (MWD), melt flow (MF), and other properties of the resulting polymer are affected by use of a SCA as well. It has also been observed that the activity of the catalyst composition as a function of temperature may be affected by the choice of SCA. Often however, a SCA which gives desirable control over one polymer property, is ineffective or detrimental with respect to additional properties or features. Conversely, an SCA that is effective in combination with one procatalyst may not be effective when used in combination with a different procatalyst.

With regard to the temperature dependence of catalyst activity, it is known that the use of certain alkoxy derivatives of aromatic carboxylic acid esters, especially ethyl p-ethoxybenzoate (PEEB), in combination with a Ziegler-Natta procatalyst composition containing an ester of an aromatic monocarboxylic acid, exemplified by ethyl benzoate, results in an inherently self-extinguishing catalyst composition with respect to temperature. That is, such compositions are less active at moderately elevated polymerization temperatures, especially temperatures from about 100° to 130° C. Using such compositions, less reactor fouling or sheeting is observed, and run-away reactors due to increased polymerization rates at elevated temperatures, are largely eliminated. Disadvantageously, the combination of PEEB with a procatalyst containing a dialkylester of an aromatic dicarboxylic acid, such as diisobutylphthalate (DIBP) as an internal electron donor generally results in poor polymerization activity and production of polypropylene polymers having low isotacticity (high XS).

In contrast, alkoxysilane SCA's, exemplified by dicyclopentyldimethoxysilane (DCPDMS), methylcyclohexyldimethoxysilane (MChDMS) and n-propyltrimethoxysilane (NPTMS) generally are very efficient in forming isotactic polymers having improved physical properties, when used in combination with a dialkyl ester of an aromatic dicarboxylic acid, such as DIBP, as an internal electron donor. Disadvantageously however, these catalyst compositions are not generally self-extinguishing, thereby resulting in polymerization process control problems due, it is believed, to localized temperature excursions. For example, the polymerization activity of a typical catalyst composition containing DIBP as internal electron donor with an alkoxysilane as SCA generally increases as polymerization temperatures rise, especially at temperatures from 50° to 120° C., such that a significant level of catalyst activity may remain at reaction temperatures that are close to the softening temperature of the polymer generated.

Use of mixtures of SCA's in order to adjust polymer properties is known. Examples of prior art disclosures of catalyst compositions making use of mixed SCA's, especially mixtures of silane or alkoxysilane SCA's include: U.S. Pat. No. 5,100,981, U.S. Pat. No. 5,192,732, U.S. Pat. No. 5,414,063, U.S. Pat. No. 5,432,244, U.S. Pat. No. 5,652,303, U.S. Pat. No. 5,844,046, U.S. Pat. No. 5,849,654, U.S. Pat. No. 5,869,418, U.S. Pat. No. 6,066,702, U.S. Pat. No. 6,087,459, U.S. Pat. No. 6,096,844, U.S. Pat. No. 6,111,039, U.S. Pat. No. 6,127,303, U.S. Pat. No. 6,133,385, U.S. Pat. No. 6,147,024, U.S. Pat. No. 6,184,328, U.S. Pat. No. 6,303,698, U.S. Pat. No. 6,337,377, WO 95/21203, WO 99/20663, and WO 99/58585. Additional pertinent references include: U.S. Pat. No. 5,432,244, U.S. Pat. No. 5,414,063, JP61/203,105, and EP-A-490,451.

Despite the advances occasioned by the foregoing disclosures, there remains a need in the art to provide an aromatic dicarboxylic acid ester internal electron donor containing Ziegler-Natta catalyst composition for the polymerization of olefins, wherein the catalyst composition retains the advantages of alkoxysilane SCA containing catalyst compositions with regard to polymer properties but additionally possesses improved temperature/activity properties. Especially desired are such compositions that are inherently self-extinguishing with regard to catalyst activity as a function of temperature, thereby leading to reduced polymer agglomerate formation and improved polymerization process control without imparting an undesired odor to the polymer.

SUMMARY OF THE INVENTION

The present invention provides a catalyst composition for the polymerization of propylene or mixtures of propylene and one or more copolymerizable comonomers, said catalyst composition comprising one or more Ziegler-Natta procatalyst compositions comprising one or more transition metal compounds and one or more esters of aromatic dicarboxylic acid internal electron donors; one or more aluminum containing cocatalysts; a selectivity control agent (SCA) comprising at least one silicon containing compound containing at least one $C_{1-10}$ alkoxy group bonded to a silicon atom; and one or more activity limiting agent (ALA) compounds comprising one or more aliphatic or cycloaliphatic mono- or poly-carboxylic acids; alkyl-, aryl-, or cycloalkyl-(poly)ester derivatives thereof; or inertly substituted derivatives of the foregoing, said ALA compounds and amounts being selected such that the normalized polymerization activity of the catalyst composition at a temperature from 85° to 130° C., preferably from 100° C. to 120° C., and more preferably at 100° C., is less than the normalized polymerization activity of the catalyst composition in the presence of only the SCA compound at the same total molar quantity of SCA at said temperature.

Highly preferably, the normalized polymerization activity of the SCA/ALA combination at all temperatures from 85° to 130° C. is less than the normalized polymerization activity of the catalyst composition in the presence of only the alkoxysilane SCA compound at the same total molar quantity of SCA at said temperatures. Additionally or alternatively, it is desired that the normalized polymerization activity at a temperature from 85° to 130° C., preferably from 100° to 120° C., most preferably at 100° C., be less than the polymerization activity of the same catalyst composition at a lesser temperature, preferably 67° C. Most preferably, more than one of the foregoing conditions regarding normalized activity are met, and most highly preferably all of the foregoing conditions regarding normalized activity are met.

The present invention also provides a method of polymerizing propylene or mixtures of propylene and one or more copolymerizable comonomers under polymerization conditions using the previously described Ziegler-Natta catalyst composition comprising said mixture of SCA and ALA compounds. More particularly, the process comprises contacting propylene or a mixture of propylene and one or more copolymerizable comonomers under polymerization conditions at a temperature from 40° to 130° C., preferably from 50° to 120° C., more preferably from 60° to 100° C., with a catalyst composition comprising one or more Ziegler-Natta procatalyst compositions comprising one or more transition metal compounds and one or more internal electron donors selected from the group consisting of esters of aromatic dicarboxylic acids; one or more aluminum containing cocatalysts; a selectivity control agent (SCA) comprising at least one silicon containing compound containing at least one $C_{1-10}$ alkoxy group bonded to a silicon atom; and from one or more activity limiting agent (ALA) compounds comprising one or more aliphatic or cycloaliphatic mono- or poly-carboxylic acids; alkyl-, aryl- or cycloalkyl-(poly)ester derivatives thereof; or inertly substituted derivatives of the foregoing, said ALA compounds and amounts being selected such that the normalized polymerization activity of the catalyst composition at a temperature from 85° to 130° C., preferably from 100° C. to 120° C., and more preferably at 100° C., is less than the normalized polymerization activity of the catalyst composition in the presence of only the SCA compound at the same total molar quantity of SCA at said temperature. Additionally or alternatively, it is desired that the normalized polymerization activity of the catalyst composition at a temperature of 100° C. or greater, be less than the polymerization activity of the same catalyst composition at a lesser temperature, preferably 67° C. Most preferably both of the foregoing conditions regarding normalized activity are met.

Highly desirably, the polymerization is conducted under conditions of temperature and SCA/ALA content such that no substantial polymer agglomerates are formed in the polymer product and sheeting or fouling of the reactor surfaces is reduced, and most preferably, eliminated.

Although a broad range of compounds are known generally as selectivity control agents, a particular catalyst composition may have a specific compound or group of compounds with which it is especially compatible. The present invention provides a catalyst composition for the polymerization of propylene or mixtures of propylene and one or more copolymerizable comonomers which is especially useful with Ziegler-Natta procatalyst compositions formed by halogenation of mixed alkoxide metal compounds. As a result of the present inventors discovery, it has been unexpectedly discovered that in the foregoing operating range of mixed SCA's the advantages of using an alkoxysilane in combination with an aromatic dicarboxylic acid ester internal electron donor can be largely retained while simultaneously improving the self-extinguishing properties of the polymerization catalyst. Outside of the foregoing and following ranges of components, this result is not observed.

DETAILED DESCRIPTION

All reference to the Periodic Table of the Elements herein shall refer to the Periodic Table of the Elements, published and copyrighted by CRC Press, Inc., 2001. Also, any reference to a Group or Groups shall be to the Group or Groups as reflected in this Periodic Table of the Elements using the IUPAC system for numbering groups. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, raw materials, and general knowledge in the art. Unless stated to the contrary, implicit from the context, or customary in the art, all parts and percents are based on weight.

If appearing herein, the term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability. The term "consisting of", if used, excludes any component, step or procedure not specifically delineated or listed. The term "or", unless stated otherwise, refers to the listed members individually as well as in any combination.

As used herein, the term "(poly)" means optionally more than one, or stated alternatively, one or more. By the term, "aliphatic or cycloaliphatic mono- or polycarboxylic acid" is meant a compound containing at least one carboxylic acid group whose carbon atom is bonded to a carbon atom that is not part of an aromatic ring system. The term "aromatic" refers to a polyatomic, cyclic, ring system containing $(4\delta+2)\pi$ electrons, wherein $\delta$ is an integer greater than or equal to 1. The term "inert" or "inertly substituted" as used herein refers to groups or substituents that do not further interact with any other components or reagents used in the polymerization process or that do not interact in a manner that is significantly detrimental to the desired polymerization process.

Unless stated to the contrary or conventional in the art, all parts and percents used herein are based on weight. The term "equivalent percent" is based on equivalents of ALA, which is mols of ALA multiplied by the number of carboxylate groups per molecule and equivalents of silane compound, which is mols of SCA multiplied by the number of silicon atoms that are bonded to one or more alkoxy groups per molecule respectively. The term "mixture" when used with respect to SCA's, means the use of two or more SCA components, simultaneously during at least a portion of a polymerization. The individual SCA's may be added separately to a reactor or premixed and added to the reactor in the form of the desired mixture. In addition, other components of the polymerization mixture, including the procatalyst, may be combined with one or more of the SCA's of the mixture, and/or the procatalyst, cocatalyst and a portion of the monomer optionally prepolymerized, prior to addition to the reactor. If multiple reactors are employed in a polymerization wherein the present SCA/ALA mixture is utilized, it is to be understood that different individual components of the SCA and ALA may be employed in either reactor and that the present mixture need not be employed in all reactors of the multiple reactor train.

The benefits of the invention are obtained by operation in a range of availability of alkoxysilane compound, such that desirable polymer properties exemplified by melt flow, molecular weight distribution, and/or xylene solubles content, especially MF, are obtained while substantially reducing the polymerization activity of the catalyst composition at elevated reactor temperatures, especially reactor temperatures from 85° to 130° C., preferably from 100° to 120° C., due to the presence of the ALA.

As a standardized measure of polymerization activity at elevated temperatures for use herein, catalyst activities are adjusted to compensate for different monomer concentrations due to temperature. For example, if liquid phase (slurry or solution) polymerization conditions are used, a correction factor to account for reduced propylene solubility in the reaction mixture at elevated temperatures is included. That is, the catalyst activity is "normalized" due to the decreased solubility compared to the lower temperature, especially a 67° C. standard. The "normalized" activity, or $A_T$, at temperature T, is defined as the measured activity or (weight polymer/weight catalyst/hr) at temperature T, multiplied by a concentration correction factor, $[P(67)]/[P(T)]$, where $[P(67)]$ is the propylene concentration at 67° C. and $[P(T)]$ is the propylene concentration at temperature T. The correction factor assumes that polymerization activity increases linearly with propylene concentration under the conditions employed. The correction factor is a function of the solvent or diluent used. For example, the empirically derived propylene correction factors at 67°, 85°, 100°, 115°, 130 and 145° C. for a common $C_{6-10}$ aliphatic hydrocarbon mixture (Isopar™ E, available from Exxon Chemical Company) are 1.00, 1.42, 1.93, 2.39, 2.98 and 3.70 respectively. Under gas phase polymerization conditions, monomer solubility is normally not a factor and activity is generally uncorrected for temperature difference. That is, activity and normalized activity are the same.

The "normalized activity ratio" is defined as $A_T/A_{67}$, where $A_T$ is the activity at temperature T and $A_{67}$ is the activity at 67° C. This value can be used as an indicator of activity change as a function of temperature. For example, an $A_{100}/A_{67}$ equal to 0.30 shows that the catalyst activity at 100° C. is only 30 percent of the catalyst activity at 67° C.

It is to be understood that the present invention is not limited to the use of any particular polymerization conditions in practice. In fact, the invention is particularly beneficial when employed under gas phase polymerization conditions, in as much as control of reaction temperature and prevention of polymer agglomeration is especially critical in a gas phase polymerization.

Suitable alkoxysilanes for use in the mixture of SCA's herein are compounds having the general formula: $SiR_m(OR')_{4-m}$ (1) where R independently each occurrence is hydrogen or a hydrocarbyl or an amino group optionally substituted with one or more substituents containing one or more Group 14, 15, 16, or 17 heteroatoms, said R containing up to 20 atoms not counting hydrogen and halogen; R' is a $C_{1-20}$ alkyl group; and m is 0, 1, 2 or 3. Preferably, R is $C_{6-12}$ aryl, alkyl or aralkyl, $C_{3-12}$ cycloallyl, $C_{3-12}$ branched alkyl, or $C_{3-12}$ cyclic amino group, R' is $C_{1-4}$ alkyl, and m is 1 or 2. Examples of alkoxysilane selectivity control agents for use herein include: dicyclopentyldimethoxysilane, di-tert-butyldimethoxysilane, methylcyclohexyldimethoxysilane, ethylcyclohexyldimethoxysilane, diphenyldimethoxysilane, diisopropyldimethoxysilane, di-n-propyldimethoxysilane, diisobutyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, cyclopentylpyrrolidinodimethoxysilane, bis(pyrrolidino)dimethoxysilane, and bis(perhydroisoquinolino)dimethoxysilane. Preferred alkoxy silanes are dicyclopentyldimethoxysilane, methylcyclohexyldimethoxysilane, and n-propyltrimethoxysilane.

Suitable ALA compounds include aliphatic and cycloaliphatic monocarboxylic and polycarboxylic acids containing from 2 to 50 carbons, $C_{1-50}$ alkyl-, $C_{6-50}$ aryl- or $C_{3-50}$ cycloalkyl-esters or polyesters of aliphatic and cycloaliphatic mono- and poly-carboxylic acids containing from 3 to 500 carbon atoms in total, inertly substituted derivatives thereof, and mixtures of the foregoing. Suitable inert substituents include aliphatic, cycloaliphatic, and aromatic substituents optionally containing one or more heteroatoms from Groups 14-17 of the Periodic Table of the Elements. Examples of such substituents include halo, allyl, alkenyl, cycloalkyl, aryl, alkaryl, aralkyl, (poly)alkylether, cycloalkylether, arylether, aralkylether, alkarylether, alkylthioether, arylthioether, dialkylamine, diarylamine, diaralkylamine, trialkylsilyl, (trialkylsilyl)alkyl, carboxylic acid, carboxylic acid ester, polyvalent derivatives of the foregoing, and mixtures thereof.

Desirable aliphatic or cycloaliphatic carboxylic acids, esters and polyesters for use herein are those compounds having the formula:

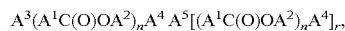

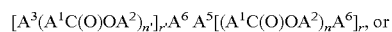

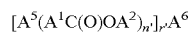

wherein:

$A^1$ independently each occurrence is a divalent aliphatic or cycloaliphatic group, a mixture thereof or a covalent bond;

$A^2$ independently each occurrence is a divalent aliphatic, cycloaliphatic or aromatic group, a mixture thereof, or a covalent bond;

$A^3$ and $A^4$ independently each occurrence are monovalent monoatomic or polyatomic groups;

$A^5$ and $A^6$ independently each occurrence are covalent bonds or polyvalent monoatomic or polyatomic groups;

r and r' are independently each occurrence numbers from 1 to 12, preferably 1, 2 or 3;

n and n' are independently each occurrence numbers from 1 to 50, preferably from 1 to 5;

with the proviso that if $A^1$ is a covalent bond, then any $A^3$ or $A^5$ to which said covalent bond is attached is aliphatic, cycloaliphatic or a mixture thereof.

Preferred are $C_{1-20}$ alkyl esters of aliphatic mono- and dicarboxylic acids wherein the alkyl group is unsubstituted or substituted with one or more Group 14, 15 or 16 heteroatom containing substituents, more preferred are $C_{1-4}$ allyl mono- and diesters of aliphatic $C_{4-20}$ monocarboxylic acids and dicarboxylic acids, especially $C_{1-4}$ alkyl esters of aliphatic $C_{8-20}$ monocarboxylic acids and dicarboxylic acids, and $C_{2-20}$ alkyl mono- or polycarboxylate derivatives of $C_{2-100}$ (Poly) glycols or $C_{2-100}$ (poly)glycol ethers. Especially preferred ALA's include ethyl acetate, methyl trimethylacetate, isopropyl myristate, di-n-butyl sebacate, (poly)(alkylene glycol) mono- or diacetates, (poly)(alkylene glycol) mono- or di-myristates, (poly)(alkylene glycol) mono- or di-laurates, (poly)(alkylene glycol) mono- or di-oleates, glyceryl tri(acetate), and mixtures thereof.

An especially preferred combination of SCA/ALA components is a mixture of an alkoxy silane selected from the group consisting of dicyclopentyldimethoxysilane, methylcyclohexyl-dimethoxysilane, and n-propyltrimethoxysilane with an ester which is isopropyl myristate, di(n-butyl) sebacate, (poly)(ethylene glycol) monolaurate, (poly)(alkene glycol) dioleate, (poly)(ethylene glycol) methyl ether laurate, glyceryl tri(acetate), or a mixture thereof.

Preferred SCA/ALA mixtures according to the invention are those comprising from 1 to 99.9, more preferably from 30 to 99, and most preferably from 50 to 98 equivalent percent of one or more ALA compounds, and correspondingly from 99 to 0.1, more preferably from 70 to 1, most preferably from 50 to 2 equivalent percent of one or more alkoxysilane compounds. Regardless of the foregoing range of components, it is to be understood by the skilled artisan that the normalized polymerization activity at an elevated temperature should be less than that obtainable at 67° C. and less than that obtainable if the alkoxysilane alone were employed alone in the same total SCA molar amount.

The total molar quantity of the SCA mixture employed in the present invention based on moles of transition metal is desirably from 0.1 to 500, more desirably from 0.5 to 100 and most preferably from 1.0 to 50. With respect to quantity of ALA, the corresponding molar ratio based on transition metal is desirably from 1 to 10,000, preferably from 2 to 1000, and most preferably from 5 to 100.

Ziegler-Natta procatalysts for use in the present invention comprise a solid complex derived from a transition metal compound, for example, titanium-, zirconium-, chromium- or vanadium-hydrocarbyloxides, hydrocarbyls, halides, or mixtures thereof; and a Group 2 metal compound, especially a magnesium halide. Preferred precursors comprise a mixture of titanium halides supported on magnesium halide compounds.

Any of the conventional Ziegler-Natta, transition metal compound containing procatalysts can be used in the present invention. The procatalyst component of a conventional Ziegler-Natta catalyst preferably contains a transition metal compound of the general formula $TrX_x$ where Tr is the transition metal, X is a halogen or a $C_{1-10}$ hydrocarboxyl or hydrocarbyl group, and x is the number of such X groups in the compound in combination with the foregoing Group 2 metal compound. Preferably, Tr is a Group 4, 5 or 6 metal, more preferably a Group 4 metal, and most preferably titanium. Preferably, X is chloride, bromide, $C_{1-4}$ alkoxide or phenoxide, or a mixture thereof, more preferably chloride.

Illustrative examples of suitable transition metal compounds that may be used to form a Ziegler-Natta procatalyst are $TiCl_4$, $ZrCl_4$, $TiBr_4$, $TiCl_3$, $Ti(OC_2H_5)_3Cl_2$, $Zr(OC_2H_5)_3Cl$, $Ti(OC_2H_5)_3Br$, $Ti(OC_3H_7)_2Cl_2$, $Ti(OC_6H_5)_2Cl_2$, $Zr(OC_2H_5)_2Cl_2$, and $Ti(OC_2H_5)Cl_3$. Mixtures of such transition metal compounds may be used as well. No restriction on the number of transition metal compounds is made as long as at least one transition metal compound is present. A preferred transition metal compound is a titanium compound.

Examples of suitable Group 2 metal compounds include magnesium halides, dialkoxymagnesiums, alkoxymagnesium halides, magnesium oxyhalides, dialkylmagnesiums, magnesium oxide, magnesium hydroxide, and carboxylates of magnesium. A most preferred Group 2 metal compound is magnesium dichloride.

Highly desirably, the procatalysts employed in the invention are derived from magnesium compounds. Examples include anhydrous magnesium chloride, magnesium chloride adducts, magnesium dialkoxides or aryloxides, or carboxylated magnesium dialkoxides or aryloxides. Preferred compounds are magnesium di($C_{1-4}$)alkoxides, especially diethoxymagnesium. Additionally the procatalysts desirably comprise titanium moieties. Suitable sources of titanium moieties include titanium alkoxides, titanium aryloxides, and/or titanium halides. Preferred compounds used to prepare the procatalysts comprise one or more magnesium-di(CIA) alkoxides, magnesium dihalides, magnesiumalkoxyhahdes, or mixtures thereof and one or more titanium tetra($C_{1-4}$) alkoxides, titanium tetrahalides, titanium($C_{1-4}$) alkoxyhalides, or mixtures thereof.

Various methods of making precursor compounds used to prepare the present procatalysts are known in the art. These methods are described in U.S. Pat. Nos. 5,034,361; 5,082,907; 5,151,399; 5,229,342; 5,106,806; 5,146,028; 5,066,737; 5,077,357; 4,442,276; 4,540,679; 4,547,476; 4,460,701; 4,816,433; 4,829,037; 4,927,797; 4,990,479; 5,066,738; 5,028,671; 5,153,158; 5,247,031; 5,247,032, and elsewhere. In a preferred method, the preparation involves chlorination of the foregoing mixed magnesium compounds, titanium compounds, or mixtures thereof, and may involve the use of one or more compounds, referred to as "clipping agents", that aid in forming or solubilizing specific compositions via a solid/solid metathesis. Examples of suitable clipping agents include trialkylborates, especially triethylborate, phenolic compounds, especially cresol, and silanes.

A preferred precursor for use herein is a mixed magnesium/titanium compound or the formula $Mg_dTi(OR^e)_eX_f$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^3$ group is the same or different; X is independently chlorine, bromine or iodine; d is 0.5 to 5, preferably 2-4, most preferably 3; e is 2-12, preferably 6-10, most preferably 8; and f is 1-10, preferably 1-3, most preferably 2. The precursors are ideally prepared by controlled precipitation through removal of an alcohol from the reaction mixture used in their preparation. An especially desirable reaction medium comprises a mixture of an aromatic liquid, especially a chlorinated aromatic compound, most especially chlorobenzene, with an alkanol, especially ethanol, and an inorganic chlorinating agent. Suitable inorganic chlorinating agents include chlorine derivatives of silicon, aluminum and titanium, especially titanium tetrachloride or titanium trichloride, most especially titanium tetrachloride. Removal of the alkanol from the solution used in the chlorination, results in precipitation of the solid precursor, having especially desirable morphology and surface area. Moreover, the resulting precursors are particularly uniform particle sized and resistant to particle crumbling as well as degradation of the resulting procatalyst.

The precursor is next converted to a solid procatalyst by further reaction (halogenation) with an inorganic halide compound, preferably a titanium halide compound, and incorporation of an internal electron donor. If not already incorporated into the precursor in sufficient quantity, the electron donor may be added separately before, during or after halogenation. This procedure may be repeated one or more times, optionally in the presence of additional additives or adjuvants, and the final solid product washed with an aliphatic solvent. Any method of making, recovering and storing the solid procatalyst is suitable for use in the present invention.

One suitable method for halogenation of the precursor is by reacting the precursor at an elevated temperature with a tetravalent titanium halide, optionally in the presence of a hydrocarbon or halohydrocarbon diluent. The preferred tetravalent titanium halide is titanium tetrachloride. The optional hydrocarbon or halohydrocarbon solvent employed in the production of olefin polymerization procatalyst preferably contains up to 12 carbon atoms inclusive, more preferably up to 9 carbon atoms inclusive. Exemplary hydrocarbons include pentane, octane, benzene, toluene, xylene, alkylbenzenes, and decahydronaphthalene. Exemplary aliphatic halohydrocarbons include methylene chloride, methylene bromide, chloroform, carbon tetrachloride, 1,2-dibromoethane, 1,1,2-trichloroethane, trichlorocyclohexane, dichlorofluoromethane and tetrachlorooctane. Exemplary aromatic halohydrocarbons include chlorobenzene, bromobenzene, dichlorobenzenes and chlorotoluenes. Of the aliphatic halohydrocarbons, compounds containing at least two chloride substituents are preferred, with carbon tetrachloride and 1,1,2-trichloroethane being most preferred. Of the aromatic halohydrocarbons, chlorobenzene and o-chlorotoluene are particularly preferred.

The halogenation may be repeated one or more times, optionally accompanied by washing with an inert liquid such as an aliphatic or aromatic hydrocarbon or halohydrocarbon between halogenations and following halogenation. Further optionally one or more extractions involving contacting with an inert liquid diluent, especially an aliphatic or aromatic hydrocarbon, especially at an elevated temperature greater than 100° C., preferably greater than 110° C., may be employed to remove labile species, especially $TiCl_4$.

Preferred Ziegler-Natta procatalysts that may be used in the present invention are disclosed in U.S. Pat. No. 4,927,797; U.S. Pat. No. 4,816,433 and U.S. Pat. No. 4,839,321. In these patents procatalyst is described comprising a solid catalyst component obtained by (i) suspending a dialkoxy magnesium in an aromatic hydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii).

Preferred internal electron donors for use in the present catalyst composition to provide tacticity control and catalyst crystallite sizing are aromatic dicarboxylic acid esters, halides or anhydrides or (poly)alkyl ether derivatives thereof, especially $C_{1-4}$ dialkyl esters of phthalic or terephthalic acid, phthaloyl dichloride, phthalic anhydride, and $C_{1-4}$ (poly)alkyl ether derivatives thereof. A highly preferred internal electron donor is diisobutyl phthalate or di-n-butyl phthalate.

The Ziegler-Natta, transition metal catalyst may also include an inert support material, if desired. The support should be an inert solid which does not adversely alter the catalytic performance of the transition metal compound. Examples include metal oxides, such as alumina, and metalloid oxides, such as silica.

Cocatalysts for use with the foregoing Ziegler-Natta catalysts according to the invention include organoaluminum compounds, such as trialkylaluminum-, dialkylaluminum hydride-, alkyl aluminum dihydride-, dialkyl aluminum halide-, alkylaluminumdihalide-, dialkylaluminum alkoxide-, and alkylaluminum dialkoxide-compounds containing from 1-10, preferably 1-6 carbon atoms in each alkyl- or alkoxide-group. Preferred cocatalysts are $C_{1-4}$ trialkylaluminum compounds, especially triethylaluminum (TEA).

One suitable method of practicing a polymerization process according to the present invention comprises performing the following steps in any order or in any combination, or subcombination of individual steps:

a) providing a Ziegler-Natta catalyst composition to a polymerization reactor;

b) providing an organoaluminum cocatalyst compound to the polymerization reactor;

c) providing a SCA/ALA mixture meeting the foregoing requirements to the polymerization reactor;

d) providing one or more polymerizable monomers to the reactor; and e) extracting polymer product from the reactor.

In another suitable method of operation, the one or more of the previously identified aliphatic or cycloaliphatic, carboxylic acid esters or polyesters may be added to the reactor intermittently as a means of controlling the polymerization activity in the reactor. In this method of operation, the reactor may be operated normally using only an alkoxysilane SCA and when conditions conducive to the formation of polymer agglomerates or a run away reaction are encountered, especially when polymerization temperatures exceed 80° C., more especially 100° C., the SCA/ALA mixture of the present invention may be formed in situ, by addition of the one or more aliphatic or cycloaliphatic, carboxylic acid esters or polyesters to the reactor contents for a time sufficient to reduce polymer agglomeration, sheeting, or fouling or to otherwise stabilize the polymerization.

In another suitable method of operation, the procatalyst is treated with the one or more aliphatic or cycloaliphatic, carboxylic acid esters or polyesters (first ALA component) in the presence of the aluminum compound cocatalyst. The resulting composition may be stored and shipped prior to use or used directly in a polymerization reaction according to the invention by combining the same with one or more alkoxysilanes (SCA component), optionally in combination with additional quantities of one or more aliphatic or cycloaliphatic, carboxylic acid ester or polyester compounds. In this embodiment, trialkylaluminum compounds are preferred cocatalysts.

In another suitable method of operation, the procatalyst may be treated with the alkoxysilane SCA component, optionally in the presence of an aluminum cocatalyst compound. The resulting composition may also be stored and shipped prior to use or used directly in a polymerization reaction according to the invention wherein only the ALA component is separately added, optionally in combination with additional quantities of one or more alkoxysilane(s). In this embodiment as well, trialkylaluminum compounds are preferred cocatalysts.

In a final embodiment, it has been discovered that improved polymer properties and activity is obtained if the alkoxysilane is contacted (precontacted) with an organoaluminum compound, preferably in at least a stoichiometric quantity, prior to contacting with the ALA compound and, further preferably, prior to contacting with the procatalyst composition. Highly preferably from 0.1 to 500 moles, most preferably from 1.0 to 100 moles of organoaluminum compound are employed per mole of alkoxysilane. Suitable organoaluminum compounds include the cocatalyst employed in the formation of the polymerization catalyst or a portion thereof. Preferred organoaluminum compounds are trialkylaluminum compounds containing from 1 to 8 carbons in each alkyl group, most preferably, triethylaluminum (TEA).

The catalyst composition of the invention may be used in most all commercially known polymerization processes, including those incorporating a pre-polymerization step, whereby a small amount of monomer is contacted with the catalyst after the catalyst has been contacted with the co-catalyst and the selectivity control agent mixture or individual components thereof. Then, the resulting preactivated catalyst stream is introduced into the polymerization reaction zone and contacted with the remainder of the monomer to be polymerized, and optionally one or more of the SCA and ALA components. When used, this results in the procatalyst additionally comprising one or more alkoxysilane compounds and an aluminum alkyl compound and the catalyst composition is prepared by combining the same with one or more ALA compounds, optionally in combination with additional quantities of one or more alkoxysilane compounds and/or one or more cocatalysts.

Preferred polymerization processes in which the present invention is particularly suited include gas phase, slurry, and bulk polymerization processes, operating in one or more than one reactor. Suitable gas phase polymerization processes include the use of condensing mode as well as super condensing mode wherein gaseous components including added inert low boiling compounds are injected into the reactor in liquid form for purposes of heat removal. Best results are obtained, especially when operating in the gas phase, at lower cocatalyst/SCA ratios. When multiple reactors are employed it is desirable that they operate in series, that is the effluent from the first reactor is charged to the second reactor and additional monomer or different monomer added to continue polymerization. Additional catalyst or catalyst components (that is procatalyst or cocatalyst) may be added, as well as additional quantities of the SCA/ALA mixture, another SCA mixture, or individual SCA or ALA compounds comprising the present SCA/ALA mixture. Highly desirably, the SCA/ALA mixture of the invention is added to only the first reactor of the series.

More preferably, the process of the invention is conducted in two reactors in which two olefins, most preferably, propylene and ethylene, are contacted to prepare a copolymer. In one such process, polypropylene is prepared in the first reactor and a copolymer of ethylene and propylene is prepared in the second reactor in the presence of the polypropylene prepared in the first reactor. Regardless of the polymerization technique employed, it is understood that the SCA/ALA mixture and the catalyst composition to be employed, or at least the procatalyst component thereof may be contacted in the absence of other polymerization components, especially monomer, prior to addition to the reactor. In a preferred embodiment, the foregoing dual polymerization processes are solution polymerizations.

Suitably, the polymerization in which the present SCA/ALA mixture is employed is conducted at temperatures from 40° to 130° C., more preferably from 60° to 100° C. The foregoing temperatures are average temperatures of the reaction mixture measured at the reactor walls. Isolated regions of the reactor may experience localized temperatures that exceed the foregoing limits.

The following embodiments of the invention are provided as specific enablement for the appended claims. Accordingly, the present invention provides:

1. A catalyst composition for the polymerization of propylene or mixtures of propylene and one or more copolymerizable comonomers, said catalyst composition comprising one or more Ziegler-Natta procatalyst compositions comprising one or more transition metal compounds and one or more esters of aromatic dicarboxylic acid internal electron donors; one or more aluminum containing cocatalysts; a selectivity control agent (SCA) comprising at least one silicon containing compound containing at least one $C_{1-10}$ alkoxy group bonded to a silicon atom; and one or more activity limiting agent (ALA) compounds comprising one or more aliphatic or cycloaliphatic mono- or poly-carboxylic acids; alkyl-, aryl-, or cycloalkyl-(poly)ester derivatives thereof; or inertly substituted derivatives of the foregoing, said ALA compounds and amounts being selected such that the normalized polymerization activity of the catalyst composition at a temperature from 85° to 130° C., preferably from 100° C. to 120° C., and more preferably at 100° C., is less than the normalized polymerization activity of the catalyst composition in the presence of only the SCA compound at the same total molar quantity of SCA at said temperature.

2. A catalyst composition for the polymerization of propylene or mixtures of propylene and one or more copolymerizable comonomers, said catalyst composition comprising one or more Ziegler-Natta procatalyst compositions comprising one or more transition metal compounds and one or more esters of aromatic dicarboxylic acid internal electron donors; one or more aluminum containing cocatalysts; a selectivity control agent (SCA) comprising at least one silicon containing compound containing at least one $C_{1-10}$ alkoxy group bonded to a silicon atom; and one or more activity limiting agent (ALA) compounds comprising one or more aliphatic or cycloaliphatic mono- or poly-carboxylic acids; alkyl-, aryl-, or cycloalkyl-(poly)ester derivatives thereof; or inertly substituted derivatives of the foregoing, said compounds and amounts being selected such that the normalized polymerization activity of the catalyst composition at a temperature from 85° C. to 130° C. is less than the normalized polymerization activity of the same catalyst composition and the SCA/ALA mixture at a lesser temperature.

3. A catalyst composition for the polymerization of propylene or mixtures of propylene and one or more copolymerizable comonomers, said catalyst composition comprising one or more Ziegler-Natta procatalyst compositions comprising one or more transition metal compounds and one or more esters of aromatic dicarboxylic acid internal electron donors; one or more aluminum containing cocatalysts; a selectivity control agent (SCA) comprising at least one silicon containing compound containing at least one $C_{1-10}$ alkoxy group bonded to a silicon atom; and one or more activity limiting agent (ALA) compounds comprising one or more aliphatic or cycloaliphatic mono- or poly-carboxylic acids; alkyl-, aryl-, or cycloalkyl-(poly)ester derivatives thereof, or inertly substituted derivatives of the foregoing, said compounds and mounts being selected such that the normalized polymerization activity of the catalyst composition at a temperature from 85° C. to 130° C. is less than the normalized polymerization activity of the catalyst composition in the presence of only the SCA compound at the same total molar quantity of SCA at said temperature, and also less than the polymerization activity of the same catalyst composition and SCA/ALA mixture at a lesser temperature.

4. A catalyst composition according to any one of embodiments 1-3 wherein the total quantity of selectivity control agent employed is limited to provide a molar ratio, based on transition metal, from 0.1 to 500.

5. A catalyst composition according to any one of embodiments 2 to 3 wherein the lesser temperature is 67° C.

6. A catalyst composition according to embodiment 4 wherein the SCA/ALA equivalent ratio is from 99/1 to 0.1/99.9.

7. A catalyst composition according to embodiment 4 wherein the SCA is a compound having the general formula: $SiR_m(OR')_{4-m}$ (1) where R independently each occurrence is hydrogen or a hydrocarbyl group optionally substituted with one or more substituents containing one or more Group 14-17 heteroatoms, said R containing up to 20 atoms not counting hydrogen or halogen; R' is a $C_{1-20}$ alkyl group; and m is 0, 1, 2 or 3 and the ALA is selected from aliphatic or cycloaliphatic carboxylic acid-, ester- and poly-ester-compounds having the formula:

$$A^3(A^1C(O)OA^2)_n A^4 A^5[(A^1C(O)OA^2)_n A^4]_r,$$

$$[A^3(A^1C(O)OA^2)_{n'}]_{r'} A^6 A^5[(A^1C(O)OA^2)_n A^6]_r, \text{ or}$$

$$[A^5(A^1C(O)OA^2)_{n'}]_{r'} A^6$$

wherein $A^1$ independently each occurrence is a divalent aliphatic or cycloaliphatic group, a mixture thereof, or a covalent bond;

$A^2$ independently each occurrence is a divalent aliphatic, cycloaliphatic or aromatic group, a mixture thereof, or a covalent bond;

$A^3$ and $A^4$ independently each occurrence are monovalent monoatomic or polyatomic groups;

$A^5$ and $A^6$ independently each occurrence are covalent bonds or polyvalent monoatomic or polyatomic groups;

r and r' are independently each occurrence numbers from 1 to 12, preferably 1, 2 or 3;

n and n' are independently each occurrence numbers from 1 to 50, preferably from 1 to 5;

with the proviso that if $A^1$ is a covalent bond, then any $A^3$ or $A^5$ to which said covalent bond is attached is aliphatic, cycloaliphatic or a mixture thereof 8. A catalyst composition according to embodiment 7 wherein the selectivity control agent is selected from the group consisting of: dicyclopentyldimethoxysilane, di-tert-butyldimethoxysilane, methylcyclohexyldimethoxysilane, ethylcyclohexyldimethoxysilane, diphenyldimethoxysilane, diisopropyldimethoxysilane, di-n-propyldimethoxysilane, diisobutyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, cyclopentylpyrrolidinodimethoxysilane, bis(pyrrolidino)-dimethoxysilane, and bis(perhydroisoquinolino)dimethoxysilane and the ALA is selected from the group consisting of: ethyl acetate, methyl trimethylacetate, isopropyl myristate, di-n-butyl sebacate, (poly)(alkylene glycol) mono- or diacetates, (poly)(alkylene glycol) mono- or di-myristates, (poly)(alkylene glycol) mono- or di-laurates, (poly)(alkylene glycol) mono- or di-oleates, glyceryl tri(acetate), mixed glycerides of linoleic, oleic, palmitic and stearic acids, and mixtures thereof.

9. A catalyst composition according to embodiment 8 wherein the selectivity control agent is selected from the group consisting of: dicyclopentyldimethoxysilane, methylcyclohexyldimethoxysilane, and n-propyltrimethoxysilane and the ALA is selected from the group consisting of: isopropyl myristate, di(n-butyl)sebacate, (poly)(ethylene glycol) monolaurate, (poly)(alkene glycol) dioleate, poly(ethylene glycol) methyl ether laurate, glyceryl tri(acetate), or a mixture thereof.

10. A polymerization embodiment comprising contacting propylene or a mixture of propylene and one or more copolymerizable comonomers under polymerization conditions at a temperature from 40° to 130° C. with a catalyst composition according to embodiment 4.

11. A process according to embodiment 10 which is a gas phase polymerization process.

12. A process according to embodiment 10 which is conducted in more than one reactor operating in series.

EXAMPLES

The invention is further illustrated by the following examples that should not be regarded as limiting of the present invention. Unless stated to the contrary or conventional in the art, all parts and percents are based on weight.

A titanium containing Ziegler-Natta catalyst composition is employed to produce polypropylene homopolymers. The catalyst composition includes a procatalyst compound prepared by slurrying a mixture of a magnesium diethoxide and titanium ethoxide/chloride containing precursor corresponding to the formula $Mg_3Ti(OC_2H_5)_8Cl_2$ (made substantially according to U.S. Pat. No. 5,077,357) with diisobutylphthalate (0.2 liter/kilogram precursor) in a 50/50 (vol/vol) mixture of $TiCl_4$/monochlorobenzene (MCB, 19 liters/kilogram precursor). After the mixture is heated at 113° C. for 60 minutes, it is filtered. The resulting moist mass is slurried in a 50/50 $TiCl_4$/MCB mixture (19 liters/kilogram precursor) at 113° C. for 30 minutes, filtered, and the process repeated once more. The resulting solid is rinsed with isopentane and then dried with flowing warm nitrogen. The resulting procatalyst containing 2.6 percent Ti is ground and sieved prior to use in polymerizations.

Propylene polymerizations are carried out in a 48 cell automated, combinatorial multireactor (available from Symyx Technologies, Inc.) operated substantially according to the teachings of U.S. Pat. No. 6,306,658. All solvents are dried prior to use. Reagents and reactor conditions employed are: an initial charge of 70 kPa (10 psig) $H_2$, 110 μl of a 0.20M solution of triethylaluminum (TEA) in mixed alkanes (calculated to provide an Al/Ti molar ratio of 500/1), 4515 μl of mixed alkanes, propylene at a pressure of 0.7 MPa (100 psig) (supplied continuously during the polymerization), 132 μl of a 0.01 M solution of SCA mixture in mixed alkanes (calculated to give a SCA/Ti ratio of 30/1) followed by 500 μl of mixed alkanes, and 275 μl of a toluene slurry of the procatalyst, again followed by 500 μl of mixed alkanes. Polymerization is terminated by addition of $CO_2$ at the end of 3600 seconds or upon sensing a preset propylene flow limit of approximately 150 percent of initial charge. Upon completion of polymerization, the reactors are vented to ambient pressure; the glass vials containing polymer are removed and devolatilized in a rotary evaporator at 25° C. for 16 hours. The polymer yields are determined by weight difference of the vials before and after polymerization and devolatilization.

The SCA/ALA mixtures tested include: n-propyltrimethoxysilane (NPTMS) with ethylacetate (EA), methyltrimethylacetate (MTMA), and di(n-butyl)sebacate (DBS); dicyclopentyldimethoxysilane (DCPDMS)/with DBS; and methylcyclohexyldimethoxysilane (MChDMS)/with DBS, glyceryltriacetate (GTA), beeswax (mixed straight chain carboxylic acid esters, primarily myricyl palmitate, $C_{15}H_{31}C(O)O(C_{30}H_{61})$), coconut oil (mixed glycerides of lauric, capric, myristic, palmitic and oleic acids), corn oil (mixed glycerides of linoleic, oleic, palmitic and stearic acids), Cyanox™ STDP (available from Cytec Industries, Inc.), Irganox™ 1010, Tinuvin™ 622 and Tinuvin™ 770 (all available from Ciba-Geigy Corporation).

The latter trademarked compounds have the following structural formulas:

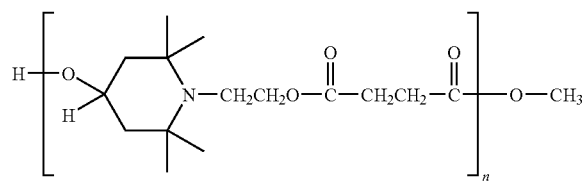

Tinuvin 622

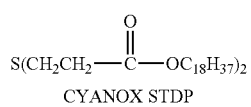

CYANOX STDP

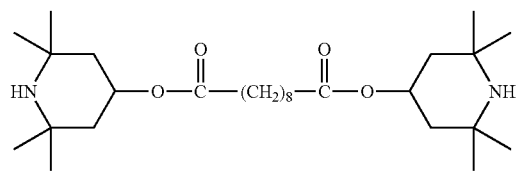

Tinuvin 770

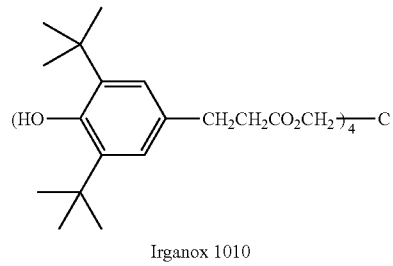

Irganox 1010

Normalized activity ($A_T$) as well as ($A_T/A_{67}$) for the various SCA combinations, amounts and temperatures are provided in Table 1. All results are the average of from two to four individual polymerizations.

TABLE 1

Monocarboxylate ALA Compounds

| Run | SCA | ALA | SCA/ALA/Ti (mol/mol/mol) | SCA/CO$_2$/Tl (mol/mol/mol | SCA/ALA (mol. %) | Temp (° C.) | Normalized Activity, $A_1$ (kg/g/hr) | $A_1/A_{67}$ (%) |
|---|---|---|---|---|---|---|---|---|
| A1* | NPTMS | — | 30/0/1 | 30/0/1 | 100/0 | 67 | 2.95 | 100 |
| A2* | " | — | " | " | " | 100 | 6.27 | 213 |
| A3* | " | — | " | " | " | 115 | 1.65 | 56 |
| B1* | — | EA | 0/30/1 | 0/30/1 | 0/100 | 67 | 2.23 | 100 |
| B2* | — | " | " | " | " | 100 | 1.51 | 68 |
| B3* | — | " | " | " | " | 115 | 0.69 | 31 |
| C1* | — | MTMA | 0/30/1 | 0/30/1 | 0/100 | 67 | 1.85 | 100 |
| C2* | — | " | " | " | " | 100 | 1.41 | 76 |
| C3* | — | " | " | " | " | 115 | 0.79 | 43 |
| 1a | NPTMS | EA | 1.2/28.2/1 | 1.2/28.2/1 | 4/96 | 67 | 2.67 | 100 |
| 1b | " | " | " | " | " | 100 | 0.91 | 34 |
| 1c | " | " | " | " | " | 115 | 0.50 | 19 |
| 2a | NPTMS | MTMA | 1.5/28.5/1 | 1.5/28.5/1 | 5/95 | 67 | 3.16 | 100 |
| 2b | " | " | " | " | " | 100 | 1.25 | 40 |
| 2c | " | " | " | " | " | 115 | 0.65 | 20 |

*comparative, not an example of the invention

As may be seen by reference to the results of Table 1, by using SCA/ALA mixtures according to the invention, reduced polymerization activity (normalized) may be obtained at elevated polymerization temperatures, compared to use of the silane SCA compound alone or compared to the use of the same SCA/ALA mixture at a lower polymerization temperature. The reduction may be controlled by adjusting the quantities of SCA and ALA employed, so that normalized activity levels substantially less than those obtainable by use of the SCA alone or less than the activity with the same SCA/ALA mixture at 67° C. are obtainable. Those illustrated compositions possess self-limiting polymerization properties. Accordingly, use of such SCA/ALA mixtures can reduce or avoid an uncontrolled acceleration of the reaction, as well as softening or melting of polymer particles that leads to agglomerate formation and sheeting or fouling of the reactor. Analysis of the resulting polymers produced from alkoxysilane containing SCA/ALA mixtures demonstrate that the polymers retain beneficial tacticity and molecular weight distribution properties due to the use of the alkoxysilane SCA.

Tables 2, 3 and 4 illustrate the results of using dicarboxylic acid esters, tricarboxylic acid esters and various carboxylate compounds respectively.

TABLE 2

Dicarboxylate ALA Compounds

| Run | SCA | ALA | SCA/ALA/Ti (mol/mol/mol) | SCA/CO$_2$/Tl (mol/mol/mol) | SCA/ALA (mol. %) | Temp (° C.) | Normalized Activity, A$_1$ (kg/g/hr) | A$_1$/A$_{67}$ (%) |
|---|---|---|---|---|---|---|---|---|
| D1* | MChDMS | PEEB | 1.5/28.5/1 | 1.5/28.5/1 | 5/95 | 67 | 3.16 | 100 |
| D2* | " | " | " | " | " | 100 | 1.10 | 35 |
| D3* | " | " | " | " | " | 115 | 0.88 | 28 |
| E1* | NPTMS | — | 30/0/1 | 30/0/1 | 100/0 | 67 | 2.95 | 100 |
| E2* | " | — | " | " | " | 100 | 6.27 | 213 |
| E3* | " | — | " | " | " | 115 | 1.65 | 56 |
| F1* | MChDMS | — | 30/0/1 | 30/0/1 | 100/0 | 67 | 5.75 | 100 |
| F2* | " | — | " | " | " | 100 | 4.75 | 83 |
| F2* | " | — | " | " | " | 115 | 2.15 | 37 |
| G1* | DCPDMS | — | 30/0/1 | 30/0/1 | 100/0 | 67 | 5.99 | 100 |
| G2* | " | — | " | " | " | 100 | 5.96 | 100 |
| G3* | " | — | " | " | " | 115 | 3.85 | 64 |
| 3a | MChDMS | DBS | 0.75/14.625/1 | 0.75/29.25/1 | 5/95 | 67 | 5.17 | 100 |
| 3b | " | " | " | " | " | 100 | 0.85 | 16 |
| 3c | " | " | " | " | " | 115 | 0.53 | 10 |
| 4a | MChDMS | DBS | 1.5/14.25/1 | 1.5/28.5/1 | 10/90 | 67 | 7.00 | 100 |
| 4b | " | " | " | " | " | 100 | 0.89 | 13 |
| 4c | " | " | " | " | " | 115 | 0.84 | 12 |
| 5a | MChDMS | DBS | 3/27/1 | 3/54/1 | 10/90 | 67 | 3.57 | 100 |
| 5b | " | " | " | " | " | 100 | 0.58 | 16 |
| 5c | " | " | " | " | " | 115 | 1.36 | 38 |
| 6a | MChDMS | DBS | 6/24/1 | 6/48/1 | 20/80 | 67 | 4.85 | 100 |
| 6b | " | " | " | " | " | 100 | 2.78 | 57 |
| 6c | " | " | " | " | " | 115 | 1.79 | 37 |
| 7a | MChDMS | DBS | 9/21/1 | 9/42/1 | 30/70 | 67 | 5.69 | 100 |
| 7b | " | " | " | " | " | 100 | 3.69 | 65 |
| 7c | " | " | " | " | " | 115 | 1.58 | 28 |
| 8a | NPTMS | DBS | 3/27/1 | 3/54/1 | 10/90 | 67 | 3.35 | 100 |
| 8b | " | " | " | " | " | 100 | 0.81 | 24 |
| 8c | " | " | " | " | " | 115 | 0.62 | 19 |
| 9a | NPTMS | DBS | 6/24/1 | 6/48/1 | 20/80 | 67 | 3.54 | 100 |
| 9b | " | " | " | " | " | 100 | 1.49 | 42 |
| 9c | " | " | " | " | " | 115 | 0.91 | 26 |
| 10a | NPTMS | DBS | 9/21/1 | 9/42/1 | 30/70 | 67 | 3.85 | 100 |
| 10b | " | " | " | " | " | 100 | 1.60 | 42 |
| 10c | " | " | " | " | " | 115 | 0.91 | 24 |
| 11a | DCPDMS | DBS | 0.75/29.25/1 | 0.75/58.5 | 2.5/97.5 | 67 | 3.44 | 100 |
| 11b | " | " | " | " | " | 100 | 1.33 | 39 |
| 11c | " | " | " | " | " | 115 | 1.24 | 36 |
| 12a | DCPDMS | DBS | 1.5/28.5/1 | 1.5/57/1 | 5/95 | 67 | 4.64 | 100 |
| 12b | " | " | " | " | " | 100 | 1.81 | 39 |
| 12c | " | " | " | " | " | 115 | 1.86 | 40 |
| 13a | DCPDMS | DBS | 3/27/1 | 3/54/1 | 10/90 | 67 | 4.82 | 100 |
| 13b | " | " | " | " | " | 100 | 3.65 | 76 |
| 13c | " | " | " | " | " | 115 | 2.03 | 42 |

*comparative, not an example of the invention
PEEB = ethyl p-ethoxybenzoate

Polymer properties for polymers prepared using the foregoing SCA/ALA mixtures are analyzed and determined to be substantially the same as those of polymers prepared using the corresponding SCA alone.

TABLE 3

Tricarboxylate ALA Compounds SLA = MChDMS

| Run | ALA | SCA/ALA/Ti (mol/mol/mol) | SCA/CO$_2$/Tl (mol/mol/mol) | SCA/ALA (mol. %) | Temp (° C.) | Normalized Activity, A$_1$ (kg/g/hr) | A$_1$/A$_{67}$ (%) |
|---|---|---|---|---|---|---|---|
| H1* | PEEB | 1.5/28.5/1 | 1.5/28.5/1 | 5/95 | 67 | 3.16 | 100 |
| H2* | " | " | " | " | 100 | 1.10 | 35 |
| H3* | " | " | " | " | 115 | 0.88 | 28 |
| I1* | — | 30/0/1 | 30/0/1 | 100/0 | 67 | 5.75 | 100 |
| I2* | — | " | " | " | 100 | 4.75 | 83 |
| I3* | — | " | " | " | 115 | 2.15 | 37 |
| 14a | triacetin | 0.75/9.75/1 | 1.5/28.5/1 | 7/93 | 67 | 5.40 | 100 |
| 14b | " | " | " | " | 100 | 2.10 | 39 |
| 14c | " | " | " | " | 115 | 1.20 | 22 |

TABLE 3-continued

Tricarboxylate ALA Compounds SLA = MChDMS

| Run | ALA | SCA/ALA/Ti (mol/mol/mol) | SCA/CO$_2$/Tl (mol/mol/mol) | SCA/ALA (mol. %) | Temp (° C.) | Normalized Activity, A$_1$ (kg/g/hr) | A$_1$/A$_{67}$ (%) |
|---|---|---|---|---|---|---|---|
| 15a | triacetin | 1.5/9.5/1 | 1.5/28.5/1 | 14/86 | 67 | 8.52 | 100 |
| 15b | " | " | " | " | 100 | 2.43 | 29 |
| 15c | " | " | " | " | 115 | 1.41 | 17 |

*comparative, not an example of the invention
PEEB = ethyl p-ethoxybenzoate,
triacetin = glyceryl triacetate Polymer properties for polymers prepared using the foregoing SCA/ALA mixtures are analyzed and determined to be substantially the same as those of polymers prepared using the corresponding SCA alone.

TABLE 4

Mixed Carboxylate Functional Group Containing ALA Compounds SCA = MChDMS

| Run | ALA | SCA/ALA/Ti (mol/mol/mol) | SCA/CO$_2$/Tl (mol/mol/mol) | SCA/ALA (mol. %) | Temp (° C.) | Normalized Activity, A$_1$ (kg/g/hr) | A$_1$/A$_{67}$ (%) |
|---|---|---|---|---|---|---|---|
| J1* | PEEB | 1.5/28.5/1 | 1.5/28.5/1 | 5/95 | 67 | 3.16 | 100 |
| J2* | " | " | " | " | 100 | 1.10 | 35 |
| J3* | " | " | " | " | 115 | 0.88 | 28 |
| K1* | — | 30/0/1 | 30/0/1 | 100/0 | 67 | 5.75 | 100 |
| K2* | — | " | " | " | 100 | 4.75 | 83 |
| K3* | — | " | " | " | 115 | 2.15 | 37 |
| 16a | Irganox ™ | 1.5/7.125/1 | 1.5/28.5/1 | 17/83 | 67 | 5.13 | 100 |
| 16b | " | " | " | " | 100 | 2.45 | 48 |
| 16c | " | " | " | " | 115 | 1.29 | 25 |
| 17a | Cyanox ™ | 1.5/14.25/1 | 1.5/28.5/1 | 10/90 | 67 | 6.87 | 100 |
| 17b | " | " | " | " | 100 | 2.01 | 29 |
| 17c | " | " | " | " | 115 | 1.12 | 16 |
| 18a | Tinuvin ™ 622 | | ~1.5/28.5/1 | | 67 | 4.20 | 100 |
| 18b | " | | " | | 100 | 2.97 | 71 |
| 18c | " | | " | | 115 | 1.55 | 37 |
| 19a | Tinuvin ™ 770 | 1.5/14.25/1 | 1.5/28.5/1 | 10/90 | 67 | 2.72 | 100 |
| 19b | " | " | " | " | 100 | 1.06 | 39 |
| L1* | — | 30/0/1 | 30/0/1 | 0/100 | 67 | 5.75 | 100 |
| L2* | — | " | " | " | 115 | 2.15 | 37 |
| 20a | beeswax | ~1.5/28.5/1 | ~1.5/28.5/1 | ~5/95 | 67 | 4.65 | 100 |
| 20b | " | " | " | " | 100 | 1.37 | 29 |
| 20c | " | " | " | " | 115 | 1.15 | 25 |
| 21a | coconut oil | 1.5/9.5/1 | 1.5/28.5/1 | 14/86 | 67 | 4.97 | 100 |
| 21b | " | " | " | " | 100 | 2.57 | 52 |
| 21c | " | " | " | " | 115 | 1.67 | 34 |
| 22a | corn oil | 1.5/9.5/1 | 1.5/28.51 | 14/86 | 67 | 5.21 | 100 |
| 22b | " | " | " | " | 100 | 2.70 | 52 |
| 22c | " | " | " | " | 115 | 1.46 | 28 |

*comparative, not an example of the invention
PEEB = ethyl p-ethoxybenzoate

Polymer properties for polymers prepared using the foregoing SCA/ALA mixtures at 67° C. are analyzed and determined to be substantially the same as those of polymers prepared using the corresponding SCA alone at the same temperature.

We claim:

1. A catalyst composition comprising:
   a procatalyst composition;
   a cocatalyst;
   a selectivity control agent (SCA) comprising one or more silicon containing compounds; and
   an activity limiting agent (ALA) selected from the group consisting of (poly)(alkylene glycol) mono- or di-acetates, (poly)(alkylene glycol) mono- or di-myristates, (poly)(alkylene glycol) mono- or di-laurates, (poly)(alkylene glycol) mono- or di-oleates, glyceryl tri(acetate), and mixtures thereof, said ALA and amount being selected such that the normalized polymerization activity of the catalyst composition at a temperature from 85 to 130° C., is less than the normalized polymerization activity of the catalyst composition in the presence of only the SCA compound at the same total molar quantity of SCA at said temperature.

2. The catalyst composition of claim 1 wherein the SCA is selected from the group consisting of dicyclopentyldimethoxysilane, di-tert-butyldimethoxysilane, methylcyclohexyldimethoxysilane, ethylcyclohexyldimethoxysilane, diphenyldimethoxysilane, diisopropyldimethoxysilane, di-n-propyldimethoxysilane, diisobutyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, cyclopentylpyrrolidinodimethoxysilane, bis(pyrrolidino)dimethoxysilane, bis(perhydroisoquinolino)dimethoxysilane, and combinations thereof.

3. The catalyst composition of claim 1 wherein the ALA comprises (poly)(ethylene glycol) monolaurate.

4. The catalyst composition of claim 1 wherein the ALA comprises (poly)(alkene glycol) dioleate.

5. The catalyst composition of claim 1 wherein the ALA comprises poly(ethylene glycol) methyl ether laurate.

6. The catalyst composition of claim 1 wherein the SCA/ALA equivalent ratio is from 99/1 to 0.1/99.9.

7. A catalyst composition comprising:
   a procatalyst composition;
   a cocatalyst;
   a selectivity control agent (SCA) selected from the group consisting of dicyclopentyldimethoxysilane, methylcyclohexyldimethoxysilane, and n-propyltrimethoxysilane; and
   an activity limiting agent (ALA) comprising a sebacate, said ALA and amount being selected such that the normalized polymerization activity of the catalyst composition at a temperature from 85 to 130° C., is less than the normalized polymerization activity of the catalyst composition in the presence of only the SCA compound at the same total molar quantity of SCA at said temperature.

8. The catalyst composition of claim 7 wherein the ALA is selected from the group consisting of di(n-butyl)sebacate and bis(2,2,6,6-tetramethyl-4-piperidinyl)sebacate.

9. The catalyst composition of claim 7 wherein the ALA comprises di(n-butyl)sebacate.

10. The catalyst composition of claim 7 wherein the SCA comprises dicyclopentyldimethoxysilane and the ALA comprises di(n-butyl)sebacate.

11. The catalyst composition of claim 7 wherein the SCA/ALA equivalent ratio is from 99/1 to 0.1/99.9.

12. A catalyst composition comprising:
    a procatalyst composition;
    a cocatalyst;
    a selectivity control agent (SCA) comprising one or more silicon containing compounds; and
    an activity limiting agent (ALA) selected from the group consisting of beeswax, corn oil, and coconut oil, said ALA and amount being selected such that the normalized polymerization activity of the catalyst composition at a temperature from 85 to 130° C., is less than the normalized polymerization activity of the catalyst composition in the presence of only the SCA compound at the same total molar quantity of SCA at said temperature.

13. The catalyst composition of claim 12 wherein the SCA is selected from the group consisting of dicyclopentyldimethoxysilane, di-tert-butyldimethoxysilane, methylcyclohexyldimethoxysilane, ethylcyclohexyldimethoxysilane, diphenyldimethoxysilane, diisopropyldimethoxysilane, di-n-propyldimethoxysilane, diisobutyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, cyclopentylpyrrolidinodimethoxysilane, bis(pyrrolidino)dimethoxysilane, bis(perhydroisoquinolino)dimethoxysilane, and combinations thereof.

14. The catalyst composition of claim 12 wherein the ALA comprises one or more glycerides of one or more monocarboxylic acids selected from the group consisting of lauric acid, capric acid, myristic acid, palmitic acid, oleic acid, and combinations thereof.

15. The catalyst composition of claim 12 wherein the ALA comprises one or more glycerides of one or more monocarboxylic acids selected from the group consisting of linoleic acid, oleic acid, palmitic acid, stearic acid, and combinations thereof.

16. The catalyst composition of claim 1 wherein the ALA comprises glyceryl tri(acetate).

17. The catalyst composition of claim 1 wherein the procatalyst composition comprises one or more transition metal compounds and one or more esters of aromatic dicarboxylic acid internal electron donors.

18. The catalyst composition of claim 1 wherein the SCA comprises at least one silicon containing compound containing at least one $C_{1-10}$ alkoxy group bonded to a silicon atom.

19. The catalyst composition of claim 7 wherein the procatalyst composition comprises one or more transition metal compounds and one or more esters of aromatic dicarboxylic acid internal electron donors.

20. The catalyst composition of claim 12 wherein the procatalyst composition comprises one or more transition metal compounds and one or more esters of aromatic dicarboxylic acid internal electron donors.

* * * * *